United States Patent [19]

Fujiwara et al.

[11] Patent Number: 5,127,886
[45] Date of Patent: Jul. 7, 1992

[54] POWER TRANSMISSION BELT

[75] Inventors: Katsuyoshi Fujiwara; Tsutomu Shioyama, both of Kobe, Japan

[73] Assignee: Bando Chemical Industries, Ltd., Kobe, Japan

[21] Appl. No.: 696,886

[22] Filed: May 8, 1991

[30] Foreign Application Priority Data

May 14, 1990 [JP] Japan .................................. 2-123482

[51] Int. Cl.⁵ .............................................. F16G 1/08
[52] U.S. Cl. ................................................. 474/263
[58] Field of Search ........................... 474/261–265, 474/268; 156/138–141

[56] References Cited

U.S. PATENT DOCUMENTS

| | | | |
|---|---|---|---|
| 4,533,420 | 8/1985 | Wetzel | 474/263 |
| 4,895,555 | 1/1990 | Watanabe et al. | 474/263 X |
| 4,904,232 | 1/1990 | Kitahama et al. | |

FOREIGN PATENT DOCUMENTS 246508 11/1987 European Pat. Off. .
54-60144 4/1979 Japan .
WO84/04951 12/1984 PCT Int'l Appl. .

Primary Examiner—Thuy M. Bui
Attorney, Agent, or Firm—Armstrong & Kubovcik

[57] ABSTRACT

A V-ribbed belt having a rib rubber layer which includes a plurality of ribs extending under a tension member layer of a power transmission belt along the longitudinal direction of the belt. Short fibers are mixed in the ribs. The direction of orientation of the short fibers is near the longitudinal direction of the belt near the tension member layer and gradually changed toward near the vertical direction of the belt near the rib tops. Through the above arrangement, endurance to the shearing stress can be improved and flexibility is also maintained and consequently, endurance to rib chipping off is improved.

2 Claims, 2 Drawing Sheets

POWER TRANSMISSION BELT

BACKGROUND OF THE INVENTION

The present invention relates to a power transmission belt having a rib rubber layer which includes a plurality of ribs extending along a longitudinal direction of the belt on a belt base, and more particularly to improvement of endurance to rib chipping off.

As disclosed in the Japanese Unitily Model Registration Laying Open Gazette No. 54-60144, a power transmission belt in which short fibers such as natural fibers or synthetic fibers are oriented in a rubber of a transmission belt in the longitudinal direction of the belt in order to improve endurance to bending and endurance to cracking and consequently to improve durability of the belt has been known.

Also, the Japanese Patent Application Laying Open Gazette No. 62-219034 discloses sheets in which short fibers posses determined angle to the vertical direction of the belt by orienting short fibers in the longitudinal direction of the belt in an elastic sheet such as a rubber, etc., cutting this sheet at a determined angle, and adhering a plurality of this cut sheet.

In a V-ribbed belt having a plurality of ribs extending in parallel along the longitudinal direction of the belt under a belt base, a tension member layer for keeping a tension in order to transmit power is positioned above ribs to which the power from a pulley is applied directly. Therefore, large shearing stress is caused between a rib rubber and the tension member layer. Once a crack occurs, the crack grows rapidly and reaches to the tension member layer and rib chipping off is caused.

In order to solve the above problem, unit area load of a rib should be small. This results in increasing the belt size by 9 times from the limit size determined by the strength of the rib rubber and consequently increasing the cost.

On the other hand, as mentioned above, the strength-to-weight ratio of the rib rubber can be improved by mixing in the rib rubber the short fibers, which is oriented in a determined direction, and rib chipping off is restricted.

For example, the Japanese Patent Application Laying Open Gazette No. 62-188837 disclosed a V-ribbed belt mixed with short fibers oriented in the rib rubber layer in the widthwise direction of the belt in order to strengthen the rib rubber layer.

The direction of the shearing stress on the V-ribbed belt from the pulley is not uniform in a rib, but varies depending on parts of a rib. When the degree of orientation of the short fiber mixed in the rib rubber layer is preset at a uniform degree, that uniform degree may not suitable to the direction of the shearing stress in some parts. Thus, the strength-to-weight ratio was not fully improved.

SUMMARY OF THE INVENTION

An object of the present invention is to strengthen the rib rubber to the shearing stress and accordingly to improve the endurance of a belt to rib chipping off.

The above object is achieved by a suitable degree of orientation of the short fibers in the rib rubber to the shearing stress.

According to the present invention, a power transmission belt prerequisites a plurality of ribs extending in parallel along the longitudinal direction of the belt under the tension member layer.

The degrees of orientation of the short fibers in each rib is changed gradually from near the longitudinal direction of the belt at the end of the tension member layer to near the vertical direction of the belt at the rib top.

Near the tension member layer, large bending force is not applied but large shearing stress is applied. As described above, since the short fibers are oriented near the longitudinal direction of the belt at the end of the tension member layer, the strength to the shearing stress is improved. On the other hand, both shearing stress and bending force are applied in the part away from the tension member layer. Since the degree of orientation of the short fibers is gradually changed toward near the vertical direction of the belt in such a part, the strength to both the shearing stress and the bending forec is improved. As a result, endurance of the belt of the rib chipping off is improved.

More particularly, average orienting angle of the short fivers is $0° \sim 45°$ to the longitudinal direction of the belt in the region of $3\% \sim 30\%$ of the rib-rubber-layer thickness from the end of tension member layer, where the rib-rubber-layer thickness refers to a distance between the end of the tension member layer and the rib top. Also, average orienting angle of the short fibers is $0° \sim 60°$ to the vertical direction of the belt in the region of $3\% \sim 90\%$ of the rib-rubber-layer thickness from the rib top. By presetting the degree of orientation of the short fibers in the above way, the endurance to both the shearing stress and the bending force is maintained.

DESCRIPTION OF THE PREFERRED EMBODIMENT

The preferred embodiment is described below with reference to the accompanying drawings.

Figure 1:
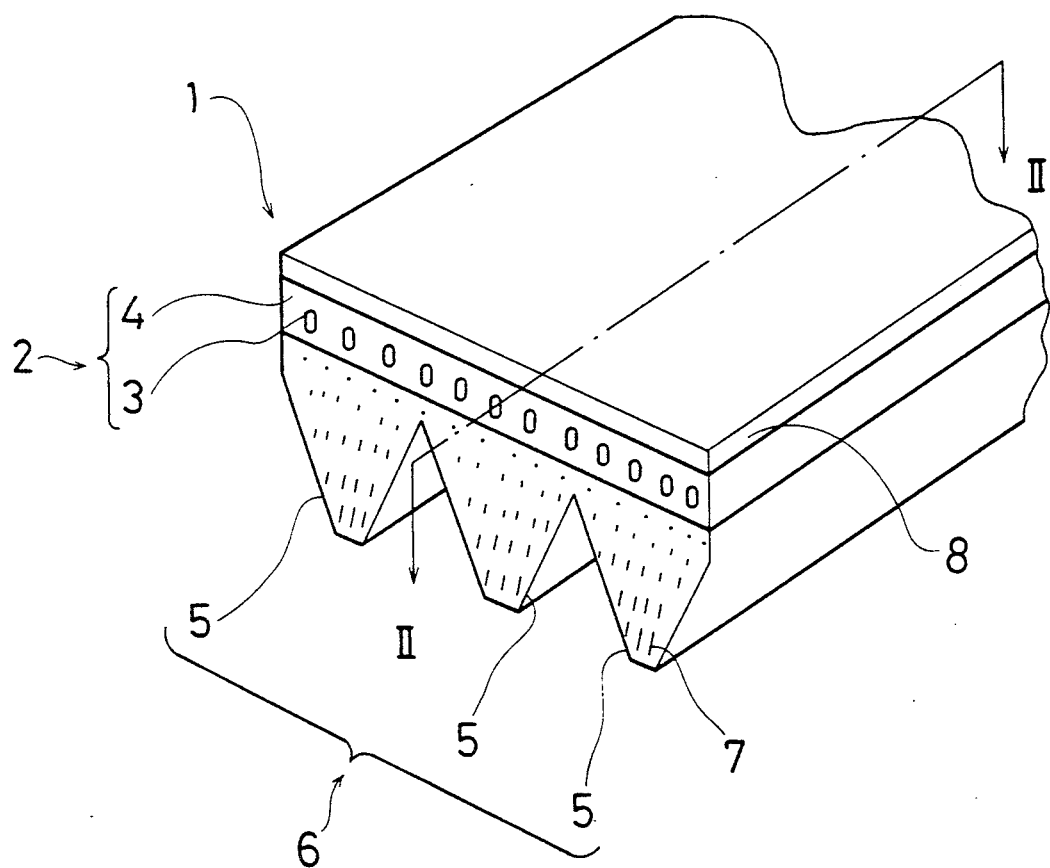
FIG. 1 is a perspective view illustrating one exemplary embodiment of a V-ribbed belt of the present invention.

As shown in FIG. 1, a V-ribbed belt 1 comprises a tension member layer 2 having a cord 3 helically wound round the belt in the adhesion rubber 4 at the same winding pitch in a widthwise direction of the belt. A rib rubber layer 6 is formed by three ribs 5 extending in parallel along a longitudinal direction of the belt under the tension member layer 2. In the rib rubber layer 6, numerous short fibers 7 for strengthening the rubber are provided. A cover fabric 8 is provided above the tension member layer 2.

The rib rubber layer 6 is consisted of materials by a following compounding ratio as shown in Table 1.

TABLE 1

| | |
|---|---|
| Chloroprene Rubber | 100 weight part |
| FEF Carbon | 40 weight part |
| Naphthenic Process Oil | 5 weight part |
| Stearic Acid | 1 weight part |
| Antioxidant (1) | 2 weight part |
| Antioxidant (2) | 1 weight part |
| ZnO | 5 weight part |
| MgO | 4 weight part |

TABLE 1-continued

| | |
|---|---|
| Cotton Fiber (2 mm in length) | 25 weight part |

In the above Table 1, Chloroprene Rubber is a Neoprene GS of the Showa Electric Co., Ltd. Antioxdant (1) is a Octilated diphenylamine and Antioxdant (2) is a p-(p-toluenesulfonylamide)-diphenylamine.

Figure 2:
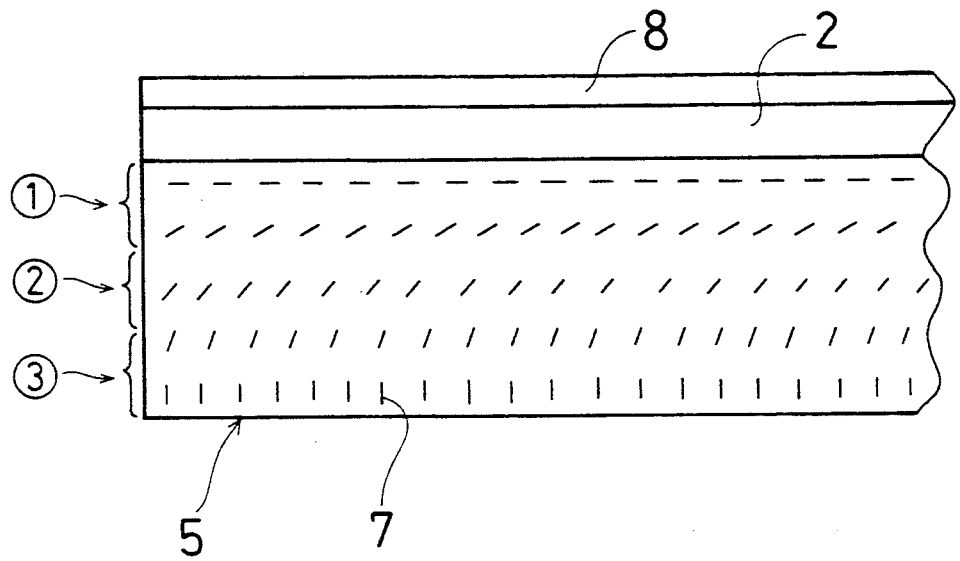
FIG. 2 is a sectional view taken on line II—II of FIG. 1, and illustrating a degree of orientation of short fibers in a rib rubber.

As shown in FIG. 2, average orienting angle of the above short fibers is 0°~45° to the longitudinal direction of the belt in a region of 3%~30% (preferably in the region of 5%~10%) of a rib-rubber-layer thickness from an end of a tension member layer 2, where the rib-rubber-layer thickness refers to a distance between the end of the tension member layer 2 and the rib top. The average degree of the orientation of short fibers of the ribs is changed gradually to near the vertical direction of the belt from the region to the rib top. The average orienting angle of the short fibers is 0°~60° (preferably 40°~50°) to the vertical direction of the belt in a region of 3%~90% of the rib-rubber-layer thickness from the rib top.

The above degree of the orientation of short fibers can be obtained by a method described below.

A method for orienting all short fibers only in the vertical direction of the belt in the rubber sheet has been known. According to the present invention, short fibers 7 are mixed in the rib rubber layer 6, being oriented in the vertical direction of the belt. Then, the shearing stress in the longitudinal direction of the belt is applied between the rib rubber layer 6 and the tension member layer 2 when a V-ribbed belt is manufactured. By utilizing the frictional force, short fibers 7 can be gradually oriented toward near the longitudinal direction of the belt in the rib rubber layer 6 near the tension member. Through such an improvement of extruding technique, a belt having short fibers oriented as the present invention can be manufactured.

The Table 2 below shows rubber property of the above rib rubber 2. A grain direction refers to a direction of orientation of short fibers 7, and a perpendicular grain direction refers to a direction perpendicular to the direction of orientation of the short fibers 7.

TABLE 2

| | |
|---|---|
| Grain direction 10% Modulus | 95 (Kg/cm$^2$) |
| Perpendicular grain direction 10% Modulus | 18 (Kg/cm$^2$) |
| Breaking Strength | 88 (Kg/cm$^2$) |
| Breaking Stretch | 140 (%) |

The results of the test of the rib chipping off by using the V-ribbed belt 1 is described below.

Figure 3:
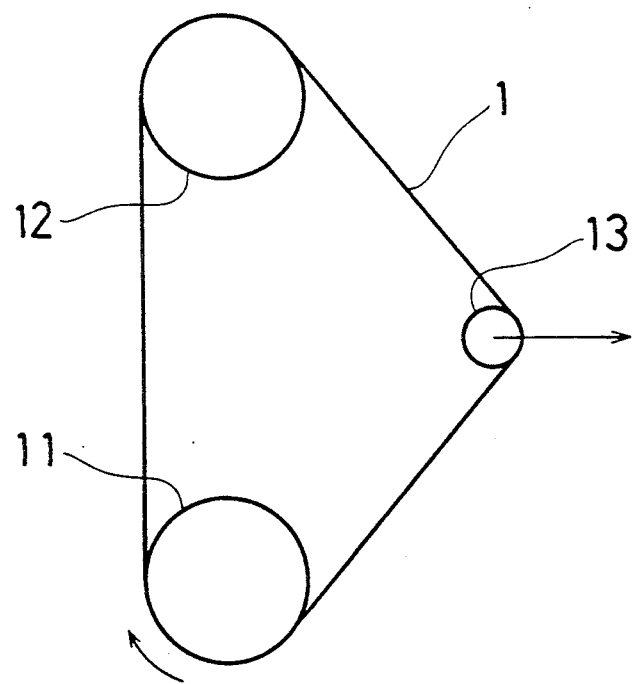
FIG. 3 is a front view illustrating a testing system used for a test of belt-rib chipping off.

FIG. 3 shows a construction of a tester for testing the rib chipping off. The V-ribbed belt 1 is wound round a driving pulley 11 (120 mm in diameter and 4900 RPM engine revolution) and a driven pulley 12 (120 mm in diameter). A set load, 85 Kgf, is applied from inner side of the belt by an inner idler (45 mm in diameter) disposed in the central part of the driving and driven pulleys.

The atmospheric temperature is 85° C. and the belt having three ribs is 975 mm in diameter.

The Table 3 below shows the service life (hours) of a belt unit the rib chipping off is occurred between belts A(1), A(2) of the present invention and belts B(1), B(2), B(3), B(4) of comparable examples which have short fibers 7 not oriented as the present invention.

TABLE 3

| | B(1) | B(2) | A(1) | A(2) | B(3) | B(4) |
|---|---|---|---|---|---|---|
| Region ① | 0° | 90° | 45° | 90° | 35° | 65° |
| Region ② | 0° | 90° | 45° | 45° | 45° | 65° |
| Region ③ | 0° | 90° | 45° | 0° | 45° | 65° |
| Service Life | 98 hours | 18 hrs | 136 hrs | 191 hrs | 104 hrs | 46 hrs |

The angle in the above Table 3 is a degree of orientation of the short fibers 7 to the vertical direction of the belt. As shown in FIG. 2, Region 1 is the region of 0%~30% of the rib-rubber-layer thickness from the end of the tension member layer 2, where the rib-rubber-layer thickness refers to a distance between the end of the tension member layer 2 and the rib top. Region 3 is the region of 0%~30% of the rib-rubber-layer thickness from the rib top. Region 2 is the region between the Region 1 and the Region 3.

As shown in Table 3, the service life of the belts, A(1), A(2) of the present invention is longer than that of the belts B(1)~B(4) of the comparable examples. Particularly, a belt such as the belt A(1) that the degree of orientation of short fibers 7 is changed gradually from near the longitudinal direction of the belt at the end of the tension member layer 2 to near the vertical direction of the belt at the rib top possesses longer service life.

In the above belts of the present invention, the degree of orientation of the short fibers 7 in the ribs is changed from near the longitudinal direction of the belt at the end of tension member layer 2 to near the vertical direction of the belt at the rib top.

The direction of the shearing stress applying to the V-ribbed belt 1 is oblique to the direction from the rib top to the tension member layer 2. The belt 1 is most flexible when short fibers are oriented in the direction which breaking stretch along the longitudinal direction of the belt is the largest.

The strength of rubber mixed with the short fibers is largest when the tensile force is applied in the direction of orientation of the short fibers 7. Also, the breaking stretch of the rubber mixed with short fibers is largest in the direction perpendicular to the direction of orientation of the short fibers 7. Near the tension member layer 2 where endurance to the shearing stress is required while flexibility is not so required, endurance to the shearing stress becomes largest by orienting the short fibers 7 near the longitudinal direction of the belt.

On the other hand, more flexibility is required near the rib top. Since the degree of orientation of the short fibers 7 is gradually changed toward near the vertical direction of the belt at the rib top from the longitudinal direction of the belt at the end of the tension member layer 2, flexibility can be maintained near the rib top. Thus, endurance to the shearing stress and endurance to the bending force of the V-ribbed belt is improved and accordingly, better endurance to the rib chipping off is obtained.

Since the rib top receives the bending force and the shearing stress, the suitable property for both the bending force and the shearing stress is obtained by presetting the degree of the orientation of the short fibers 7 at rib top at 0°~45° to the vertical direction of the belt. When the belt is used under a condition where large bending force is applied to the belt, the degree of orientation of the short fibers at rib top is preset at 0° to the vertical direction of the belt. When the belt is used under a condition where large shearing stress is applied to the belt, the degree of orientation of the short fibers is preset at 45° to the vertical direction of the belt. Thus, the belt can fulfill its requirement.

When the short fibers are oriented at an angle of 0°~45° to the longitudinal direction of the belt in the range of 3%~30% of the rib-rubber-layer thickness from the end of the tension member layer 2, where the rib-rubber-layer thickness refers to a distance between the end of the tension member layer 2 and the rib top, and the short fibers are oriented at an angle of 0°~60° to the vertical direction of the belt in the range of 3%~90% of the rib-rubber-layer thickness from the rib top, the belt corresponds to various changes of the direction and the size in the shearing stress and in the bending force in each rib and accordingly, endurance to the rib chipping off is large.

The improvement of durability of the rib rubber layer 6 to the shearing stress is achieved by improving the endurance of the V-ribbed belt to the rib chipping off. Thus, the number of ribs 5 can be reduced and an engine, etc. can get compacted in case that the belt of the present invention is applied to the engine.

The power transmission belt of the present invention is applicable to vehicles, such as automobiles and farm vehicles, and industrial power transmission systems.

What is claimed is:

1. A power transmission belt having a rib rubber layer which includes a plurality of ribs in parallel along longitudinal direction of a belt under a tension member layer, said ribs are consisted essentially of:
   a rubber mixed with numerous short fibers, orientation of said short fibers is near the longitudinal direction of the belt near said tension member layer and gradually changed toward near vertical direction of the belt near rib top.

2. A power transmission belt as claimed in claim 1, wherein average orienting angle of said short fibers is 0°~45° to the longitudinal direction of the belt in a region of 3%~30% of a rib-rubber-layer thickness from an end of said tension member layer, where said rib-rubber-layer thickness refers to a distance between said end of said tension member layer and said rib top, and average orienting angle of said short fivers is 0°~60° to the vertical direction of the belt in a region of 3%~90% of said rib-rubber-layer thickness from said rib top.

* * * * *